(12) United States Patent
Parkinson et al.

(10) Patent No.: US 10,717,212 B2
(45) Date of Patent: Jul. 21, 2020

(54) AUTOMATED FABRICATION OF FIBROUS PREFORM

(71) Applicant: Cytec Industries Inc., Princeton, NJ (US)

(72) Inventors: Robert Parkinson, Wrexham (GB); Samuel Hill, Wrexham (GB); Riccardo Moraglia, Cuneo (IT); Sebastien Greber, Brynteg (GB)

(73) Assignee: Cytec Industries Inc., Princeton, NJ (US)

( * ) Notice: Subject to any disclaimer, the term of this patent is extended or adjusted under 35 U.S.C. 154(b) by 187 days.

(21) Appl. No.: 15/825,146

(22) Filed: Nov. 29, 2017

(65) Prior Publication Data
US 2018/0147778 A1    May 31, 2018

(30) Foreign Application Priority Data

Nov. 29, 2016   (GB) .................................. 1620227.7

(51) Int. Cl.
| | |
|---|---|
| *B29C 35/08* | (2006.01) |
| *B29C 70/54* | (2006.01) |
| *B29C 70/38* | (2006.01) |
| *B29B 11/16* | (2006.01) |
| *B29C 33/68* | (2006.01) |
| *B29C 70/34* | (2006.01) |
| *B29C 70/48* | (2006.01) |
| *B29C 70/44* | (2006.01) |
| *B29K 105/08* | (2006.01) |

(52) U.S. Cl.
CPC .......... *B29C 35/0805* (2013.01); *B29B 11/16* (2013.01); *B29C 33/68* (2013.01); *B29C 70/34* (2013.01); *B29C 70/38* (2013.01); *B29C 70/384* (2013.01); *B29C 70/388* (2013.01); *B29C 70/543* (2013.01); *B29C 70/443* (2013.01); *B29C 70/48* (2013.01); *B29C 70/54* (2013.01); *B29C 2035/0822* (2013.01); *B29C 2035/0838* (2013.01); *B29K 2105/0872* (2013.01)

(58) Field of Classification Search
None
See application file for complete search history.

(56) References Cited

U.S. PATENT DOCUMENTS

| | | | |
|---|---|---|---|
| 6,096,164 A | 8/2000 | Benson et al. |
| 6,390,169 B1 | 5/2002 | Johnson |
| 6,451,152 B1 | 9/2002 | Holmes et al. |
| 7,063,118 B2 | 6/2006 | Hauber et al. |
| 7,293,590 B2 | 11/2007 | Martin |

(Continued)

*Primary Examiner* — Barbara J Musser
(74) *Attorney, Agent, or Firm* — Thi Dang

(57) ABSTRACT

An automated method for producing a fibrous preform on a tool surface. Such fibrous preform is configured to receive liquid resin via resin infusion. A disposable layer containing a small amount of radiation absorbing material is placed onto the tool surface prior to the automated placement of the first ply of dry fibrous material. Particles of a polymeric or resinous binder are applied on an exposed surface of the disposable layer to enhance adhesion of the first ply. The dry fibrous material may be in the form of elongated, narrow-width fiber tapes or broader fabrics that can be deposited onto the tool surface by an automated placement method. The disposable layer may be in the form of a flexible polymeric film, a release film, a peel ply or a polymer-coated glass cloth.

23 Claims, 1 Drawing Sheet

(56) References Cited

U.S. PATENT DOCUMENTS

| | | |
|---|---|---|
| 7,407,556 B2 | 8/2008 | Oldani et al. |
| 7,810,539 B2 | 10/2010 | Mischler et al. |
| 7,842,145 B2 | 11/2010 | Hogg |
| 8,191,596 B2 | 6/2012 | Hamlyn et al. |
| 8,557,074 B2 | 10/2013 | McCowin |
| 8,702,884 B2 | 4/2014 | Kuntz et al. |
| 8,714,226 B2 | 5/2014 | Senibi et al. |
| 8,733,417 B2 | 5/2014 | Hamlyn et al. |
| 8,771,567 B2 | 7/2014 | Piepenbrock et al. |
| 9,010,395 B2 | 4/2015 | Blot et al. |
| 9,126,376 B2 | 9/2015 | Jessrang et al. |
| 2006/0048881 A1 | 3/2006 | Evans et al. |
| 2013/0177727 A1 | 7/2013 | Samejima et al. |
| 2014/0008845 A1* | 1/2014 | Huda ................... B29C 70/443 264/511 |
| 2014/0238590 A1* | 8/2014 | Kybelund ............. B29C 70/543 156/245 |
| 2014/0261993 A1 | 9/2014 | Samejima et al. |

\* cited by examiner

AUTOMATED FABRICATION OF FIBROUS PREFORM

The instant application claims benefit of priority from United Kingdom Application No. 1620227.7 filed Nov. 29, 2016, which is incorporated herein by reference.

DETAILED DESCRIPTION

Figure 1:
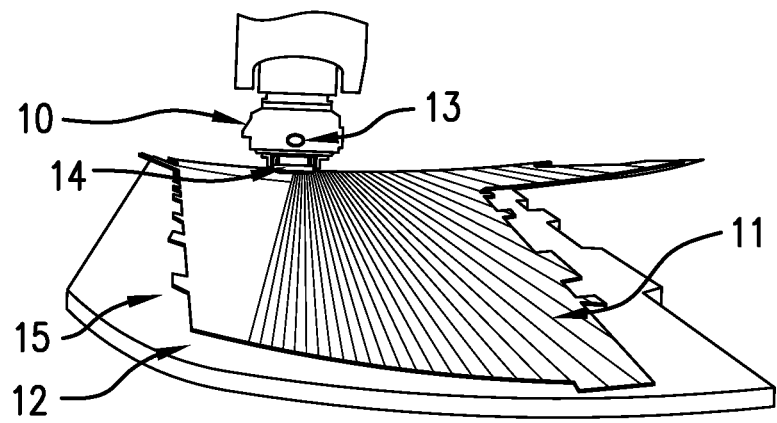
FIG. 1 illustrates an exemplary automated method for laying down a first ply of fiber tapes onto a tool surface.

Three-dimensional composite parts can be formed of fiber-reinforced polymer matrix. These parts can be manufactured using different methods, one of which is liquid resin infusion. Resin Transfer Molding (RTM) and VARTM are examples of manufacturing processes that involve injecting or infusing a liquid resin into a fibrous preform. The fibrous preform is porous enough to allow the resin to infuse or impregnate it completely during the resin infusion operation. Exemplary applications of such methods include aircraft wing skins and fuselages.

During the RTM process, the fibrous preform is placed into an enclosed mold cavity, and the resin is injected into the cavity under pressure. The mold with the preform is often put under vacuum so that the vacuum removes all the air in the preform and speeds up the RTM process. Once the liquid resin fills the mold cavity, the resin is cured, resulting in the formation of a composite part. VARTM is similar to RTM except that a single-sided tool is normally used with vacuum bagging, and vacuum pulls the liquid resin into the preform. These techniques are well suited for the manufacturing of structural parts with very complex shapes.

Traditionally, the dry fibrous preform for forming the composite part via liquid moulding is prepared by a manual lay-up operation, wherein superimposed layers of dry fibrous materials are laid up on a tool that defines substantially the shape of the composite part. The layers of fibrous materials may be in the form of nonwoven or woven fabrics, for example, non-crimped fabrics (NCF), which have not been pre-impregnated with resin. While laying up the layers onto the tool, the operator must be careful to make them adopt the shape of the tool without inducing wrinkling or bridges. Such manual operation is laborious and slow.

Another manufacturing method for forming composite parts is a prepreg lay-up process, whereby layers of resin-impregnated composite material are laid up, one on top of another, in a stacking arrangement on a tool surface that can reproduce the shape of the composite part. The layup of composite layers are then consolidated and cured to produce a hardened composite part. The Automated placement methods such as Automated Reinforcement Laying (ATL) and Automated Fiber Placement (AFP) have been used to build up, layer by layer, a curable prepreg part. The ATL or AFP process involves automatically dispensing a plurality of narrow-width, flat strips of composite material, side by side, onto a tool surface to create a layer of large dimensions, referred to as a "ply". Additional plies are sequentially built onto the previously disposed ply to produce a layup with a desired thickness. Each strip of composite material, also called "prepreg tape", is composed of reinforcement fibers impregnated with a resin or polymeric material. The reinforcement fibers may be unidirectional carbon fibers impregnated with a thermosetting resin that will harden upon curing or embedded within a thermoplastic matrix that can be moulded with heat into the desired shape. The term "unidirectional" refers to alignment in one direction. Such pre-impregnated fibre is normally either tacky (or sticky) to the touch at room temperature or becomes so when heated up to or above the softening or melting temperature of the resin or polymer. This automated placement method is done at high speed and is typically capable of laying down prepreg tapes in a variety of configurations corresponding to the surface of a selected tool surface that reproduces the shape of the final composite part.

An ATL or AFP machine commonly includes a fiber placement head, a robotic system for moving the fiber placement head in different directions across a tool surface, storage creels on which continuous strips of prepreg tapes, are wound, and mechanisms for guiding the tapes from the creels onto the fiber placement head. The fiber placement head includes a rotatable compaction roller and conveying means for conveying the tapes from the creels to the compaction roller. The compaction roller is configured to come into contact against the tool surface in order to apply the tapes against the tool surface or a prior disposed ply of tapes. The machine further includes cutting means, e.g. a blade, for cutting the length of the continuous reinforcement from the supply creel. The placement head may be configured to deposit multiple tapes simultaneously during a single passage.

The placement head is joined to the robotic system that controls its movement. The robotic system is software programmed to direct all lateral and vertical movements required of the fiber placement head. The robotic system may include a standard six-axis robotic poly-articulated arm, mounted on the ground or mounted on a linear axis, with an end wrist joint to which the fiber placement head is fixed, or by a Cartesian-coordinate robot equipped with an end wrist joint carrying the placement head. "Cartesian-coordinate robot" refers to a robot with three linear principal axes of control at right angles to each other. That is, the robot moves in a straight line rather than rotate. The three sliding joints correspond to moving the wrist up-down, in-out, and back-forth.

Commercially available ATL/AFP machines with robotic fiber placement heads from Coriolis Composites, MTorres and Automated Dynamics are examples of the ATL/AFP machines discussed above.

In a typical ATL/AFP operation, the placement head makes repeated passages over the tool surface to lay down multiple tapes, side by side, in a defined pattern until a first ply of desired dimensions is formed. During each passage, the fiber placement head applies (or deposits) one or more continuous tapes from the supply creel(s) onto the tool surface while the placement head moves relative to the tool surface. The length of the continuous reinforcement(s) is/are cut at the end of each passage. During the formation of the first ply, the compaction roller presses the tapes against the tool surface to facilitate adhesion of the tapes. Multiple plies of tapes are built up, layer by layer, by continued passages of the placement head over the prior laid ply. The compaction roller presses the subsequently laid tapes against the previously laid tapes to compact, i.e. consolidate, the superimposed tapes. The compaction roller may comprise a cylindrical body made of a flexible material, which is elastically deformable by compression. For example, the cylindrical body may be composed of a non-expanded elastomeric material, such as silicone, polysiloxane or polyurethane.

The aforementioned automated placement methods can be used to form a fibrous preform from which a composite part will be formed via liquid resin infusion. The automated placement method would increase processing speed and reduce costs as compared to the conventional manual operations that have been used to produce fibrous preforms. Instead of prepreg tapes, a dry fibrous material in the form of narrow-width fiber tapes or broader fabrics is used in an automated placement method. The dry fibrous material is considered "dry" because it is dry to the touch (i.e. non-tacky) at room temperature and is not fully impregnated with a resin or embedded in a resin matrix. It contains mostly of reinforcement fibers (more than 50% by weight). As such, the dry fibrous material remains porous and is permeable to liquid, particularly liquid resin that is used for RTM and VARTM.

A solution is provided herein to overcome the issue relating to the placement of the first layer of dry fibrous material onto a tool surface in an automated placement process such as ATL and AFP. To that end, a disposable layer containing a small amount of radiation absorbing material is placed onto the tool surface prior to the placement of the first layer of fibrous material. The disposable layer may be in the form of a flexible polymeric film that will be removed after the preform has been produced and serves no other function during the manufacturing process of the composite article. Alternatively, the disposable layer may be a material that serves a function later on in the manufacturing process. As examples, the disposable layer may be a peel ply, a release film or polymer-coated glass cloth. The term "disposable layer" as used herein refers to a layer that is used in the manufacturing of a composite article and then discarded after the final composite article has been manufactured.

The radiation absorbing material in the disposable layer is chosen to absorb energy at the same frequency or frequency range as the radiation energy source installed in the fiber placement head of the automated placement apparatus. To further enhance adhesion of the first layer of fibrous material to the disposable layer during automated placement, a small amount of polymeric or resinous binder may be pre-applied onto the upper surface of the disposable layer. In such embodiments, it is necessary to heat the binder on the disposable layer before the first layer of fibrous material is placed over the disposable layer. If the first layer has to bond to a tool surface without a binder or bonding aid in some form, the bonding process would likely fail.

According to one embodiment of the present disclosure, a fibrous preform is produced by an automated method that includes:

(a) affixing a disposable layer onto the tool surface, the disposable layer comprising a radiation absorbing material, in particulate form, dispersed within the layer;

(b) placing a first ply of fibrous material onto the disposable layer in an automated manner;

(c) using a radiation energy source to emit radiation toward the disposable layer before the first ply comes into contact with the disposable layer so as to heat the disposable layer, (d) pressing the first ply against the disposable layer with a compacting device, e.g. compacting roller;

(e) successively placing one or more additional plies of fibrous material onto the first ply in an automated manner, and pressing each subsequent ply against the prior laid ply with the compacting device.

The number plies are laid up until a preform of desired thickness is produced. Each ply of fibrous material is porous and permeable to liquid resin, thus, the resulting preform is ready for receiving liquid resin via a subsequent resin infusion process such as RTM and VaRTM. After resin infusion, the resin-infused preform is cured to yield a hardened composite structure.

In one embodiment, the fibrous material is in the form of elongated or continuous, narrow-width fiber tapes. Each fiber tape has a longitudinal length that is much greater than its width, e.g., 100 times its width. In this embodiment, the first ply in step (b) is formed by placing a plurality of fiber tapes side-by-side on the disposable layer in an automated manner. The radiation energy source on the robotic fiber placement head emits radiation toward the disposable layer before each fiber tape comes into contact with the disposable layer, and the compacting device presses the fiber tape against the disposable layer after each fiber tape is placed onto the disposable layer. Thereafter, successive plies of side-by-side fiber tapes are laid onto the first ply in the same manner. The radiation energy source emits radiation toward the prior laid fiber tapes before the subsequent fiber tapes come into contact with the prior laid tapes.

According to an alternative embodiment, the same automated placement method is carried out using wider fabric plies that can be deposited by automation instead of fiber tapes. The fabric plies may have a width (or shortest linear dimension) of up to 5 m (or 197 in), and may have a length (or longest linear dimension) of up to 150 m (or 492 ft), but the dimensions can vary depending on the size and shape of the preform to be produced. When wider fabric plies are used to build a preform, individual fabric plies, each having the predetermined dimensions, may be laid down one on top of another in a stacking arrangement until a desired thickness is reached, resulting in a layup of superimposed fabric plies. Each layer in the layup may be comprised of several pieces of fabric or a single piece of fabric.

The automated placement of fibrous materials may be carried out in an ATL/AFP machine discussed previously, which is equipped with a robotic fiber placement head, on which the radiation energy source and the compacting device are installed. The robotic fiber placement head is controlled to move relative to the tool surface in various directions.

In some embodiments, the radiation energy source is capable of emitting radiation in the wavelength range of 10 nm to 1 cm. A suitable radiation energy source is a laser such as diode lasers, Nd:YAG, $CO_2$ and fiber lasers. In some embodiments, the laser is an infrared laser that operates in the wavelength range of 750 nm to 1500 nm, particularly, 800 nm to 1000 nm. Alternative radiation energy sources include flash lamps, infrared lamps, incandescent filaments, and arc lamps.

The radiation absorbing material (also referred herein as "radiation absorber") may be any material that can absorb the radiation emitted from the radiation energy source and convert the radiation energy into heat energy. As such, the disposable layer containing the radiation absorber therein becomes hotter when the radiation energy source emits radiation thereon. Suitable radiation absorbers include carbon black, inorganic oxides and dyes. The "particulate form" includes particles, flakes, nanotubes and other discrete structures of any shape. The carbon black may be in the form of carbon particles or flakes, or carbon nanotubes. Examples of suitable radiation absorbing dyes include indolinocyamine, tryphenylmethane, naphthalocyanine, and indonaphthol metal complex dyes. The amount of radiation absorber may be in the range of 0.5% to 30% by weight based on the total weight of the disposable layer.

Disposable Layer

The disposable layer may be a flexible polymeric film with the radiation absorber incorporated therein such that the radiation absorber is present throughout the film. As examples, the flexible polymeric film may be formed of a material selected from: polyamide (e.g. nylon), polyethylene (PE), ethylene-tetrafluoroethylene copolymers (ETFE), fluorinated ethylene propylene copolymer (FEP), and polyvinyl fluoride (PVF), polypropylene (PP), polyaryletherketone such as polyether ether ketone (PEEK), polyimide (such as Kapton), polyurethane, polyvinyl alcohol (PVOH), silicone, polyvinyl chloride (PVC), polyvinylidene difluoride (PVDF), ethylene chlorotrifluoroethylene (ECTFE), and combinations thereof. The thickness of the flexible film may be up to 0.20 mm, and in some embodiments, it is in the range of 0.01 mm to 0.10 mm.

The polymeric film may be formed by blending one or more molten polymers with the radiation absorber, in particulate form, and extruding the blend into a film.

To enhance bonding, this polymeric film may be pre-applied with a small amount of polymeric or resinous binder onto an upper surface (the surface not in contact with the tool). The binder may be in the form of solid particles or powder scattered onto the polymeric film's surface.

Alternatively, the disposable layer may be a peel ply comprising fibers, which contain radiation absorbing material, as particulates, dispersed within the fibers themselves or coated on the fibers. In one embodiment, the peel ply is a sheet of woven fabric, e.g. a fabric with a basket weave. It is textured, porous and not permanently adherent to (i.e., peelable from) the resin-infused preform after curing thereof. After curing, the peel ply is removed from the cured composite structure to yield a bondable surface that can be bonded to another structure or a surface ready for painting. The peel ply fibers may be formed of polyester, polyamide, glass, polypropylene, and polyethylene. In the case where the peel ply fibers are polymeric fibers, the radiation absorber, e.g. carbon particles, may be incorporated into the polymeric fibers during the manufacturing of the fibers. For example, particles of radiation absorbing material may be incorporated into a molten polymer prior to extrusion of the molten polymer to form fibers.

Alternatively, the disposable layer may be a polymer-coated glass cloth, for example, polytetrafluoroethylene (PTFE)-coated glass cloth containing radiation absorber. The radiation absorber, as particulates, is incorporated into the polymer coating prior to application onto the glass cloth. The thickness of the polymer-coated glass cloth may be in the range of 0.05 mm to 0.30 mm. This polymer-coated glass cloth functions as a release layer which can be peeled off from the resin-infused preform after curing, i.e., the hardened composite structure. In some cases, the peel ply is used in combination with the polymer-coated glass cloth. In such cases, only one of these materials is required to contain the radiation absorber—the one adjacent to the first ply of fibrous material.

Alternatively, the disposable layer may be a nonporous release film made of non-adherent polymers such as fluoropolymers, including ethylene-tetrafluoroethylene copolymers (ETFE), fluorinated ethylene propylene copolymer (FEP), polyvinylidene difluoride (PVDF), chlorotrifluoroethylene (CTFE), ethylene chlorotrifluoroethylene (ECTFE), poly chlorotrifluoroethylene (PCTFE), and polyvinyl fluoride (PVF), polyolefins, including polyethylene (PE), HDPE and LDPE, polypropylene (PP), poly methyl pentene (PMP), polyurethane (PU), polyvinyl alcohol (PVOH), polyimide (PI), copolymers thereof and combinations thereof. Such release film provides a surface that is resistant to adhesion with the resin-infused preform after curing thereof such that the release film can be peeled off from the cured structure. The thickness of the release film may be in the range of 0.01 mm to 0.10 mm.

The disposable layer discussed above may be placed manually onto the tool surface or by the automated placement system previously disclosed.

To enhance adhesion with the first ply of fibrous material, a small amount of polymeric or resinous binder is applied to the disposable layer's upper surface. The amount of binder may be in the range of 0.1 gsm ($g/m^2$) to 50 gsm. In some embodiments, the binder is in the form of polymeric or resinous particles that will soften and/or become tacky when heated. As such, when the first ply is laid down onto the disposable layer while being exposed to radiation emission, the first ply is affixed to the disposable layer via the presence of the softened/tacky binder particles.

Exemplary Embodiment

Figure 2:
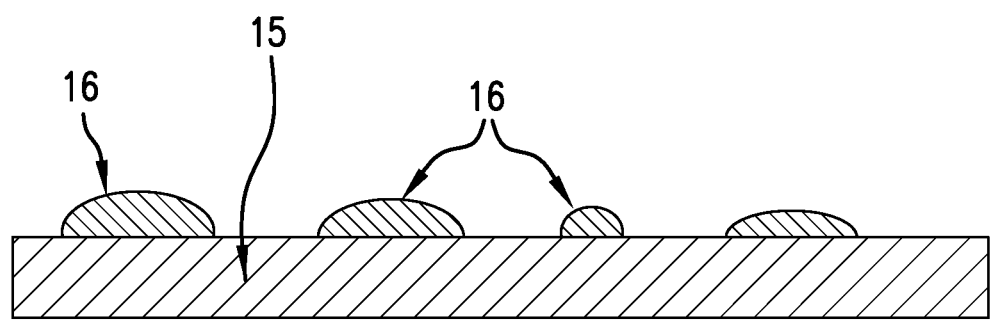
FIG. 2 illustrates a flexible film that may be used in the method of FIG. 1.

FIG. 1 illustrates an exemplary automated method for laying down a first ply of fiber tapes onto a tool surface. Referring to FIG. 1, a fiber placement head 10 of an AFP system is controlled by a robotic moving system (not shown) to lay down narrow-width, fiber tapes 11, side by side, onto an upper surface of a tool 12. The fiber tapes contain mostly fibers and are substantially resin free but for a small amount (e.g., less than 15% by weight) of polymeric or resinous binder sufficient for holding the fibers together. An infrared laser 13 is installed in the fiber placement head 10 to emit radiation towards the tool surface during the reinforcement laying operation. The fiber placement head 10 also includes a compaction roller 14. Before the first ply of dry fiber tapes is laid down onto the tool surface, a flexible film 15 containing a radiation absorber is disposed on the tool surface. The flexible film 15 also has a small amount of polymeric or resinous binder 16 applied onto its upper surface, as illustrated by FIG. 2, prior to the deposition of the first ply. In one embodiment, the binder is in the form of particles composed of a mixture of a thermoplastic polymer and a thermosettable resin. The binder particles are solids at ambient temperature (20° C.-25° C.) and will soften at an elevated temperature above said ambient temperature. When heated to a predetermined temperature, the solid binder particles transition into a molten and/or tacky state. As such, when the first ply of fiber tapes is laid down, the fiber tapes are affixed to the flexible film with the aid of the heated, molten/tacky binder particles.

The thickness of the flexible film 15 may be up to 0.20 mm, and in some embodiments, it is in the range of 0.01 mm to 0.10 mm.

In one embodiment, the radiation source is an infrared laser and the flexible film is a polyamide (i.e., nylon) film containing a small amount of carbon black, e.g., 0.5% by weight based on the total weight of the film, wherein the carbon black is present in particulate form throughout the film.

The flexible film may be affixed to the tool surface by vacuuming. For example, the tool surface may be provided with a plurality of holes which are connected to a vacuum source. Alternatively, the flexible film may be affixed to the tool surface by using conventional mechanical attachment means such as clamps. For example, the flexible film may be stretched over the tool surface, covering the edges of the tool, and clamps are used to attach the stretched film to the edges of the tool.

During the first ply application, the laser radiation is emitted onto the flexible film just before the tapes are laid down onto the flexible film, the radiation absorber in the flexible film absorbs the radiation energy from the laser, and the binder on the flexible film is softened and/or becomes tacky. The compaction roller of the fiber placement head presses the fiber tapes against the flexible film and the underlying tool surface. The heat generated by absorbing the radiation from the laser is then transferred from the flexible film to the tapes, causing the binder on the tapes to become hotter. The presence of the hot molten/tacky binder on the flexible film facilitates the adhesion of the first ply of tapes to the flexible film.

During the formation of subsequent, superimposed plies, the laser emits radiation energy onto the prior laid tapes just before the subsequent tapes are applied, causing the binder on the prior laid tapes to soften and/or become tacky. The compaction roller presses the fiber tapes against the previously laid fiber tapes such that the adhesion of the deposited tapes between each other is facilitated. Following the deposition of superposed plies to form a fibrous preform with a desired thickness and shape, the resulting perform is injected or infused with a liquid resin. In the case of resin infusion with a curable or thermosettable resin, the resin-infused preform is subsequently cured, for example, in an oven or an autoclave to produce a hardened composite structure.

The laser's power and the spread of the laser beam can be adjusted according the softening or melting temperature of the binder applied on the flexible film's surface and the dimensions of the fiber tapes.

Binder

Suitable binders for applying onto the disposable layer include compositions that comprise thermoplastic polymer(s) or thermosettable resin(s), or combinations thereof, as the major component (i.e., making up at least 50% by weight of the binder). As example, suitable thermosettable resins include epoxy resins and modified epoxy resins. Suitable thermoplastic polymers include, but are not limited to, polyurethane and modified polyurethane, polyhydroxyether (or phenoxy), polyarylether; polyarylsulphone, combinations thereof and copolymers thereof.

In some embodiments, the binder is a solid at a temperature of up to 50° C., has a softening point (as measured by Differential Scanning Calorimeter (DSC) at a temperature above 50° C., for example, in the range of 65° C. to 125° C., and comprises a blend of epoxy resin and thermoplastic polymer. In some embodiments, the binder is void of any catalyst or cross-linking agent which is active above 65° C. The thermoplastic polymer in the binder may be a polyaromatic polymer comprising ether-linked repeating units and optionally thioether-linked repeating units, the units being selected from:

—(Ph-A-Ph)$_n$— and optionally

—(Ph)$_a$— wherein A is CO or $SO_2$, Ph is phenylene, n=1 to 2 and can be fractional, a=1 to 4 and can be fractional, provided that when a exceeds 1, the phenylenes are linked linearly through a single chemical bond or a divalent group other than —CO— or —$SO_2$—, or are fused together directly or via a cyclic moiety selected from the group consisting of an acid alkyl group, a (hetero) aromatic, a cyclic ketone, a cyclic amide, an imide, a cyclic imine and combinations thereof. In some embodiments, the polyaromatic polymer is a polyarylsulphone selected from polyethersulphone (PES), polyetherethersulphone (PEES), and PES-PEES copolymer. The method for making this solid binder may be found in U.S. Pat. No. 8,927,662. A suitable binder is the thermoplastic-epoxy binder disclosed in U.S. Pat. No. 8,927,662.

Such binder may be applied in powder form to the flexible film by spraying or a conventional coating technique such as dry-bar coating, whereby the dry powder is coated onto a release paper using a roll-over-roll or knife-over-roll coater, and the powder is then transferred onto the film.

In some embodiments, the binder on the disposable layer's surface may contain the radiation absorbing material discussed above. The advantages of incorporating the radiation absorber in the binder include:

Cheaper mass produced film could be used.

Some lasers emit at frequencies that the monomers/polymers in the binder can absorb, eliminating the need for an additional specific absorber in the film.

Providing additional mechanical strength to the binder.

Loading the binder with carbon black or carbon nanotubes may improve the electrical conductivity of the composite surface, improve electromagnetic interference (EMI) shielding and lightning strike protection.

Absorbers such as carbon black can function as a cheap filler, thereby, reducing the material cost.

Dry Fiber Tapes and Fabrics

The fiber tapes for use in the automated placement method described above may have a very narrow width of ⅛ in to 1.5 in (or 3.17 mm-38.1 mm), particularly, ¼ in to ½ in (or 6.35 mm-12.77 mm), which is typically for AFP. The fiber tapes may have a wider width, for example, 6 in to 12 in (or 152 mm-305 mm), which is typical for ATL. The wider fabric plies described above may have a width of up to 5.0 m (or 197 in).

The fiber tapes and fabric plies are flexible and can conform to the contour of the tool surfaces, including curved surfaces and surfaces with complex three-dimensional configurations. The fiber tapes and fabric plies are also porous and permeable to liquid, particularly, liquid resins to be used for liquid resin infusion processes such as RTM and VARTM. Unlike conventional pre-impregnated tape (or prepreg), the fiber tape or fabric ply for forming the preform is substantially resin-free except for a small amount of binder, which is sufficient to hold the fibers together. The total content of binder in the fiber tape or fabric ply may be about 15% or less by weight, for example, between 0.1 and 15% by weight, based on the total weight of the fiber tape or fabric ply. The fibers constitute the major component of the fiber tape or fabric ply, e.g. greater than 80% by weight based on the total weight of the fiber tape or fabric ply.

In one embodiment, the fiber tape is composed of a layer of unidirectional fibers laminated to a nonwoven veil at least on one side. "Unidirectional" fibers refer to fibers aligning parallel to each other in the same direction. The unidirectional fibers are high-strength reinforcement fibers such as carbon fibers, graphite fibers, glass fibers, ceramic fibers, and aramid fibers. The nonwoven veil may comprise thermoplastic fibers, carbon fibers, or a combination thereof. The fibers of the veil may be randomly oriented or not depending on the veil manufacturing process conditions. In some embodiments, the areal weight of the nonwoven veil is 10 gsm or less. Alternatively, the nonwoven veil may be in the form of a thermoplastic grid or a porous, thermoplastic membrane with a controlled pattern of apertures. The openness of the nonwoven veil (whether in the form of random fibers, grid or porous membrane) is important to ease air removal and resin flow during the resin infusion process. When the thermoplastic veil is used, it also functions as a binder for holding the unidirectional fibers in place and will soften by heating during the automated placement method disclosed herein.

In one embodiment, the fiber tape is composed of a nonwoven carbon veil laminated to one side of a layer of unidirectional carbon fibers, and contains a binder composition in an amount sufficient for holding the veil and unidirectional fibers in place.

For embodiments in which the nonwoven carbon veil(s) is/are laminated to the unidirectional fibers, a binder, particularly a liquid binder, can be applied during the fabrication of the fiber tape to enhance the cohesiveness of the reinforcement structure. Moreover, during the fabrication of the fiber tape, a binder can be applied to enhance the bonding of the veil(s) to the unidirectional fibers. The binder(s) in the fiber tape may be selected from the binder materials discussed above for the binder applied onto the disposable layer. If the nonwoven veil(s) is a sheet or randomly arranged fibers, such veil contains a small amount of binder that was added during the manufacturing of the veil. Examples of binders that may be present in the veil include poly vinyl alcohol (PVA), polyester, cross-linked polyester, polystyrene, acrylic, polyphenol, polyurethane, and their copolymers and combinations thereof.

Additional details for the fabrication of fiber tapes comprising nonwoven veils laminated to unidirectional fibers, including the types of binders used during fabrication, may be found in the published application US 2015/375461 with the publication date of Dec. 31, 2015.

The fabric plies for forming the preform may be any textile material that is porous and permeable to the liquid resin suitable for resin-infusion. The fabric plies provide reinforcement fibers that are suitable for fabricating fiber-reinforced composite structures. Such reinforcement fibers may include carbon fibers, graphite fibers, glass fibers, ceramic fibers, and aramid fibers. Examples of suitable fabrics include, but are not limited to, all woven fabrics, knitted fabrics, braided fabrics. All multi-axial fabrics, examples of which include, but are not limited to, multi-warp knitted fabrics, and non-crimp fabrics (NCF). NCF refers to a fabric that can be made by stacking one or more layers of continuous unidirectional fibers and then stitching the layers together. The unidirectional fibers in each layer may be oriented at different direction relative to the fibers of the adjacent layer. The stitching yarns hold the layers of unidirectional fibers together and allow for handling of the fabric. Multilayered fabrics containing nonwoven mat(s) or porous veil(s) attached (e.g., by bonding) to continuous unidirectional fibers are also suitable.

Each fabric ply may contain a small amount of binder for binding the fibers together and/or a porous thermoplastic veil for stabilizing the fabric ply. Stabilization refers to maintaining the cohesiveness of a single layer or multiple layers of fibers in the fabric ply so that the fabric ply can be moved, cut, transported, resin infused, or handled in a typical manner without fraying, unravelling, pulling apart, bending, wrinkling or otherwise distorting the integrity of the fabric. When present, such binder and/or thermoplastic veil is/are heated by the radiation energy source during the automated placement process disclosed herein, thereby enhancing the adhesion of the fabric plies to each other and to the disposable layer.

The invention claimed is:

1. A method for producing a fibrous preform on a tool surface, comprising:
    (a) affixing a disposable layer onto the tool surface, said disposable layer comprising a radiation absorbing material, in particulate form, dispersed within the layer and particles of a polymeric or resinous binder on an exposed surface that is not in contact with the tool surface;
    (b) placing a first ply of fibrous material on the disposable film by automation;
    (c) using a radiation energy source to emit radiation toward the disposable layer before the first ply comes into contact with the disposable layer so as to heat the disposable layer,
    (d) pressing the first ply against the disposable layer with a compacting device;
    (e) successively placing one or more additional plies of fibrous material onto the first ply by automation, and pressing each subsequent ply against the prior laid ply with the compacting device,
    wherein the fibrous material comprises more than 50% by weight of reinforcement fibers, is porous and permeable to liquid.

2. The method of claim 1, wherein the disposable layer is a flexible polymeric film comprising particles of radiation absorbing material dispersed throughout the film.

3. The method of claim 2, wherein the flexible polymeric film comprises a polymeric component selected from: polyamide, polyethylene (PE), ethylene-tetrafluoroethylene copolymers (ETFE), fluorinated ethylene propylene copolymer (FEP), and polyvinyl fluoride (PVF), polypropylene (PP), polyaryletherketone polyimide polyurethane, polyvinyl alcohol (PVOH), silicone, polyvinyl chloride (PVC), polyvinylidene difluoride (PVDF), and ethylene chlorotrifluoroethylene (ECTFE).

4. The method of claim 3, wherein the flexible polymeric film comprises polyamide as a major component, which constitutes more than 50% by weight of the polymeric film.

5. The method of claim 2, wherein the thickness of the flexible polymeric film is up to 0.20 mm.

6. The method of claim 1, wherein the disposable layer is a nonporous release film comprising:
    a polymeric component selected from: fluoropolymers, polyolefins, polypropylene (PP), poly methyl pentene (PMP), polyurethane (PU), polyvinyl alcohol (PVOH), polyimide (PI), copolymers thereof and combination thereof; and
    particles of radiation absorbing material dispersed throughout the release film.

7. The method of claim 6, wherein the disposable layer is a nonporous release film comprising fluoropolymer as a major component, which constitutes more than 50% by weight of the polymeric film.

8. The method of claim 1, wherein the disposable layer is a polymer-coated glass cloth comprising a polymeric coating with particles of radiation absorbing material dispersed therein.

9. The method of claim 1, wherein the disposable layer is a peel ply comprising a sheet of woven polymeric fibers, and the particles of radiation absorbing material are incorporated within said polymeric fibers.

10. The method of claim 1, wherein the disposable layer is a peel ply comprising a sheet of woven fibers, and the particles of radiation absorbing material are dispersed within the woven fibers.

11. The method of claim 10, wherein the woven fibers in the peel ply comprise fibers formed of a material selected from: polyester, polyamide, glass, polypropylene, and polyethylene.

12. The method of claim 1, wherein the radiation absorbing material is carbon black.

13. The method of claim 1, wherein the radiation absorbing material is selected from: indolinocyamine, tryphenylmethane, naphthalocyanine, and indonaphthol metal complex.

14. The method of claim 1, wherein the binder on the disposable layer is a solid material at ambient temperature (20° C.–25° C.), which softens or melts during step (c).

15. The method according to claim 14, wherein the binder on the disposable layer comprises a major component selected from: thermosetting resin, thermoplastic polymer, and combination thereof, and wherein said major component constitutes at least 50% by weight of the binder.

16. The method according to claim 15, wherein the binder on the disposable layer comprises a blend of at least one epoxy resin and a thermoplastic polymer.

17. The method of claim 1, wherein the radiation energy source emits radiation toward the prior laid ply of fibrous material before the subsequent ply comes into contact with the prior laid ply.

18. The method of claim 1, wherein the automated placement of the plies of fibrous material is carried out by a robotic fiber placement head, on which the radiation energy source and the compacting device are installed, and the robotic fiber placement head is controlled to move relative to the tool surface in various directions.

19. The method of claim 1, wherein the radiation energy source is a laser.

20. The method of claim 1, wherein each ply of fibrous material is comprised of a plurality of elongated fiber tapes placed side-by-side, each elongated fiber tape having a longitudinal length that is greater than its width, and each elongated fiber tape comprising a nonwoven or porous veil laminated to at least one side of a layer of unidirectional fibers,
  placement of the first ply of fibrous material at (b) comprises depositing by automation a plurality of elongated fiber tapes side-by-side onto the disposable layer,
  placement of one or more additional plies at (e) comprises depositing by automation a plurality of subsequent elongated fiber tapes side-by-side onto the prior laid fiber tapes and pressing the subsequent fiber tapes against the prior laid fiber tapes with the compacting device, and
  the radiation energy source emits radiation toward the prior laid fiber tapes before the subsequent fiber tapes come into contact with the prior laid tapes.

21. The method according to claim 20, wherein each elongated fiber tape comprising a nonwoven veil laminated to at least one side of a layer of unidirectional carbon fibers, and the nonwoven veil comprises randomly arranged fibers selected from thermoplastic fibers, carbon fibers, and a combination thereof.

22. The method according to claim 20, wherein the width of the fiber tape is in the range of 6 in to 12 in or ⅛ in to 1.5 in.

23. The method of claim 1, wherein each ply of fibrous material is a single ply of fabric or several pieces of fabric.

* * * * *